United States Patent [19]
Hioki et al.

[11] Patent Number: 5,632,453
[45] Date of Patent: May 27, 1997

[54] WINDING DEVICE FOR MEASURING TAPE

[75] Inventors: Shuzo Hioki, Kyoto; Tsutomu Usami, Nara, both of Japan

[73] Assignee: Kyoto Measuring Instruments Corp., Kyoto, Japan

[21] Appl. No.: 542,766

[22] Filed: Oct. 13, 1995

[30] Foreign Application Priority Data

Oct. 25, 1994 [JP] Japan ........................ 6-260784

[51] Int. Cl.$^6$ ................ B65H 75/48; G01B 3/10
[52] U.S. Cl. ............................. 242/385.1; 33/767
[58] Field of Search ................. 242/385.1, 385.2, 242/385.3; 33/767

[56] References Cited

FOREIGN PATENT DOCUMENTS

| | | |
|---|---|---|
| 0336858 | 10/1989 | European Pat. Off. |
| 1925001 | 10/1965 | Germany. |
| 2854058 | 6/1979 | Germany. |
| 49-11748 | 1/1974 | Japan. |
| WO8300215 | 1/1983 | WIPO. |

*Primary Examiner*—John M. Jillions
*Attorney, Agent, or Firm*—Jordan and Hamburg

[57] ABSTRACT

A winding device for winding measuring tape, which allows a user to fix the top end of a measuring tape drawn by a desired length from a housing without applying a load to the tape and to easily release the tape from the fixed condition. A winding reel comprises a winding reel body including a winding spring for winding a measuring tape and a winding reel cover. The housing is composed of an upper half and a lower half and accommodates therein the winding reel. A recess formed in the reel has an opening in an inner ring of a bearing fitted in a winding reel cover. A recess formed in the housing has an opening in an outer surface of a supporting shaft. When the winding reel slowly rotates in a rewinding direction, a roller prevents the winding reel from rotating by being disposed astride the winding reel-side recess and a winding reel locking portion which is an open end of the winding reel-side recess in a direction of drawing-out of the measuring tape.

7 Claims, 6 Drawing Sheets

WINDING DEVICE FOR MEASURING TAPE

BACKGROUND OF THE INVENTION

The present invention relates to a winding device for winding a measuring tape into its housing by the action of a winding spring.

Measuring tapes made of steel, cloth or plastics are widely used for measuring lengths and distances and they are usually wound manually or automatically into their housings.

A measuring tape usable in a self-winding tape measure has an eaves gutter shape section and has the property of straightening itself when having been drawn out from the housing. The measuring tape may be automatically rewound on a winding reel with a winding spring in a housing. The reel driving spring accumulates its force while the measuring tape is being drawn from the housing, and it automatically rotates the reel by the action of its accumulated force to wind the tape thereon.

In measuring a length or a distance with a self-winding tape measure, a user has to draw a measuring tape from the tape measure housing by a necessary length and fix the tape front end at the position by applying a force overcoming a spring force for rewinding the tape on a reel.

Many types of locking mechanisms have been realized in practical use for fixing a measuring tape stretched out from the tape measure housing, overcoming the winding spring force to reduce time and labor of fixing it by a user.

Among the locking mechanisms of the conventional measuring tape winding devices, the most popular one is of the lever type which actuates a lever by directly or indirectly applying an external force thereto to cause a tape fixing cam or pressing member to press the measuring tape against a part of the tape measure housing.

The above-mentioned conventional mechanism is effective to fix the measuring tape at a desired position but requires the user to operate the locking mechanism after drawing the measuring tape from the housing and to release the locking mechanism before rewinding the tape into the housing.

The above-mentioned locking method operates by pressing a part of the measuring tape by a fixing member against a part of the housing. This provides a problem that the measuring tape may be damaged or its scale may be rubbed off if the tape in its fixed condition is stretched out of the housing, by an accident or mis-operation, without previously releasing the lock. Furthermore, the housing shall have considerably increased size to accommodate the fixing mechanism as compared with a tape measure which has no locking mechanism.

Several kinds of self-locking or self-locking and self-releasing devices have been proposed to solve the above-mentioned problem but any of them still requires the user to release the fixing mechanism from the outside and can not eliminate the danger of damaging the measuring tape and/or other parts of the tape measure by the mis-operation. In addition, the fixing mechanism is complicated in itself with use of a spring and requires mounting in a housing of an increased size.

The Japanese Laid-open Utility Model Publication No. 49-11748 discloses a self-locking and self-releasing device for use in a tape measure, which is capable of automatically fixing and releasing a measuring tape and is simple in construction and can be mounted in a tape measure which is similar in size to the conventional unlock-type tape measure. This device, however, has an orientation of its operation. The tape lock can be automatically actuated and released only when the tape measure housing is set in a given direction. This limitation may still cause mis-operation of the device when drawing-out or rewinding the measuring tape and, therefore, can not realize fast and reliable measurement with the tape measure.

SUMMARY OF THE INVENTION

Accordingly, it is a main object of the present invention to provide a measuring tape winding device which is capable of fixing a stretched-out measuring tape by a simply constructed locking means without using a spring and like part and of releasing the locking means with no need of using an external operating means such as a push-button.

It is another object of the present invention to provide a winding device which can fix a measuring tape drawn-out by a desired length from a housing with slight rewinding and can release the measuring tape from the fixed state by slightly stretching it forwardly and eliminating the need of providing the housing with an operating portion for fixing and releasing the measuring tape.

It is another object of the present invention to provide a winding device which can fix the measuring tape without applying an external force thereto, thereby eliminating the possibility of damaging the measuring tape and scale marks thereon.

It is another object of the present invention is directed to provide a measuring tape winding device which comprises a winding reel containing a winding spring and supported by a supporting shaft and a housing for accommodating the reel, characterized in that the winding reel has a first recess with an outwardly directed opening and the housing has a second recess having an inwardly directed opening and a depth increasing in a winding direction of the winding reel, the first and the second recesses opposing each other at their openings along the cylindrical surface and a roller movably placed in the first recess and which can be held between the first and second recesses by slowly rotating in the rewinding direction for locking the winding reel from further rotating.

Another object of the present invention is to provide a measuring tape winding device which comprises a winding reel containing a winding spring and supported by a supporting shaft and which is characterized in that the housing has a first groove with an inwardly directed opening and the winding reel has a second groove with an outwardly directed opening and its depth increasing in a rewinding direction of the winding reel, the first and the second grooves opposing each other at their openings along the cylindrical surface and a roller rotatably mounted in the first groove and getting astride both grooves for preventing the winding reel from slowly reversing in the direction reverse to the winding direction.

PREFERRED EMBODIMENT OF THE INVENTION

Figure 1A:
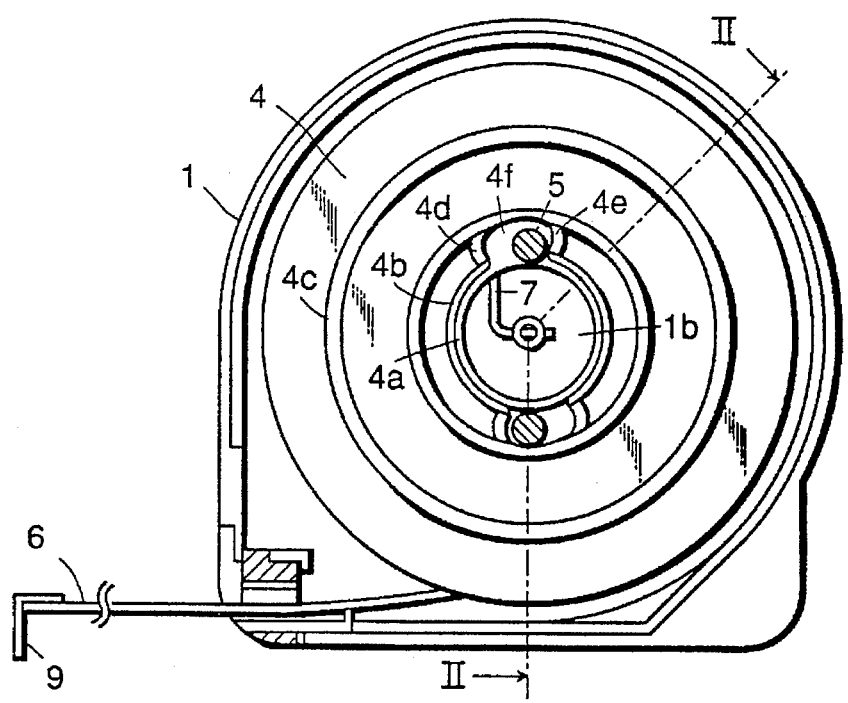
FIGS. 1A and 1B are plan views of an example of a measuring tape winding device embodying the present invention.
Figure 1B:
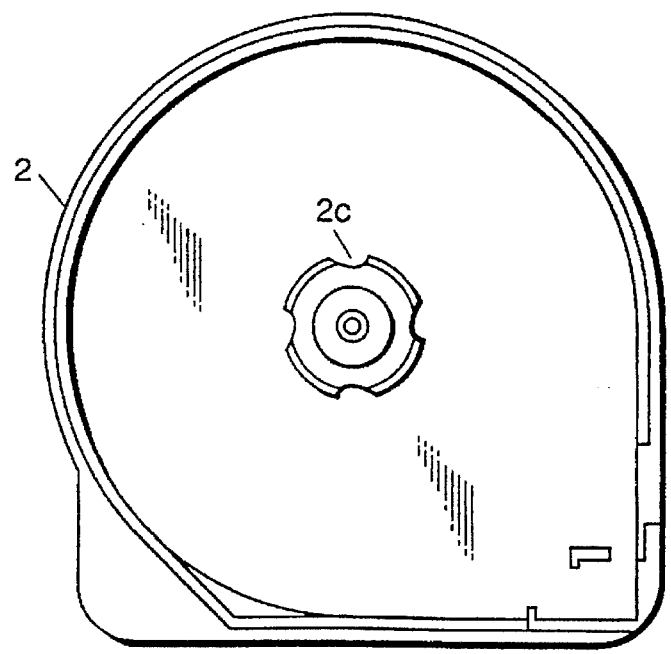
Figure 2:
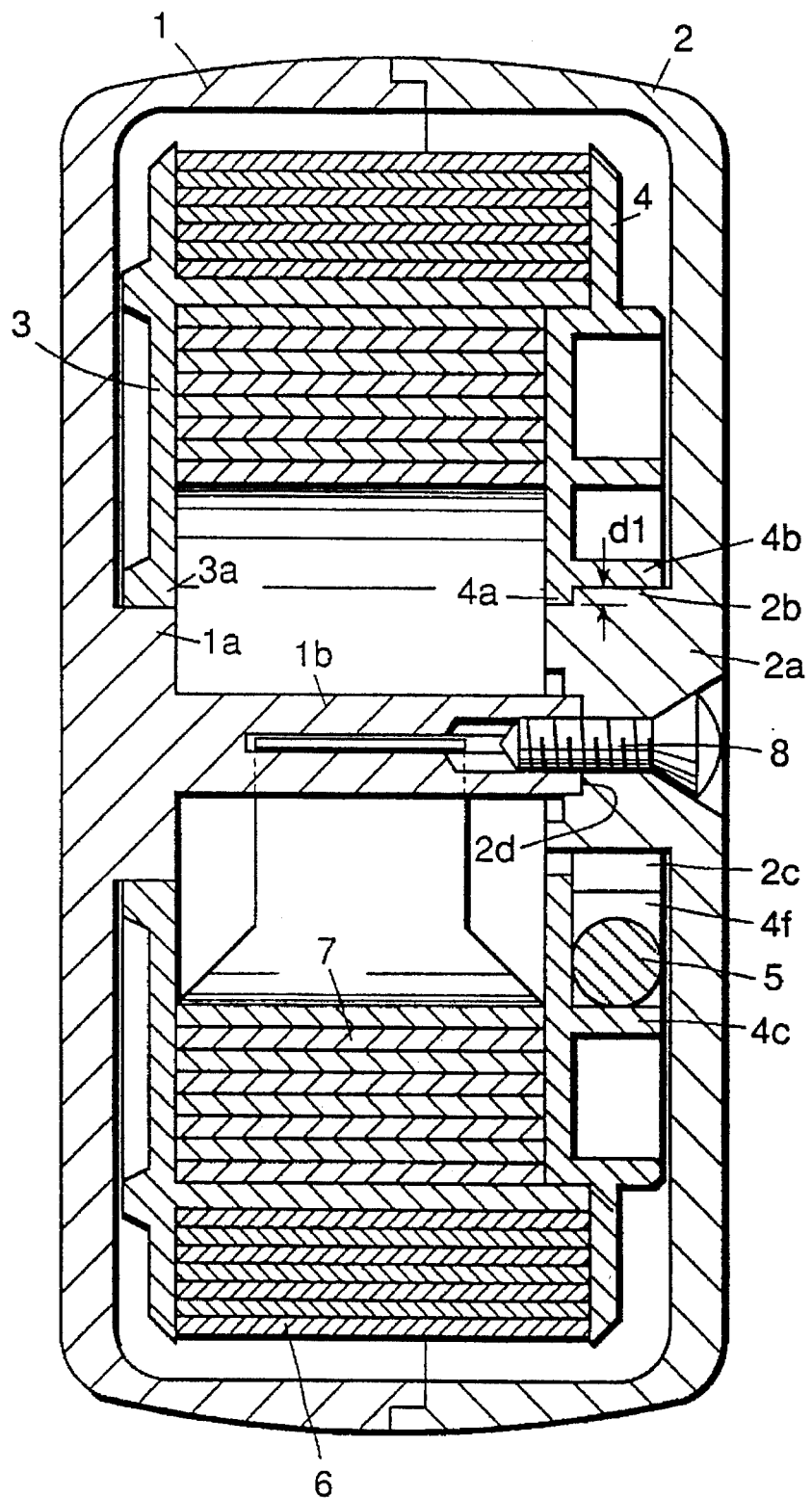
FIG. 2 is a sectional view taken on line II—II of FIG. 1.
Figure 3A:
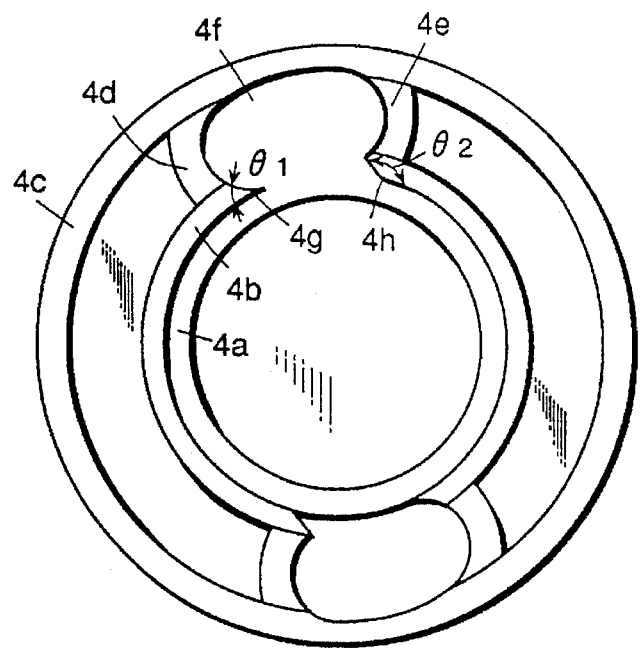
FIGS. 3A, 3B and 3C are enlarged views of housing-side recesses, rollers and a supporting portion.
Figure 3B:
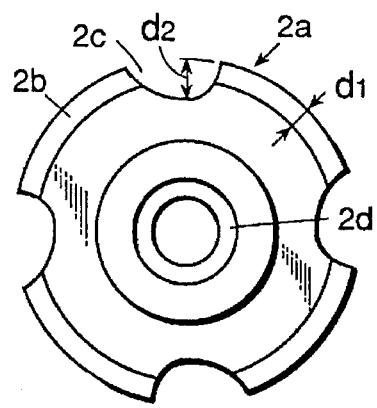
Figure 3C:
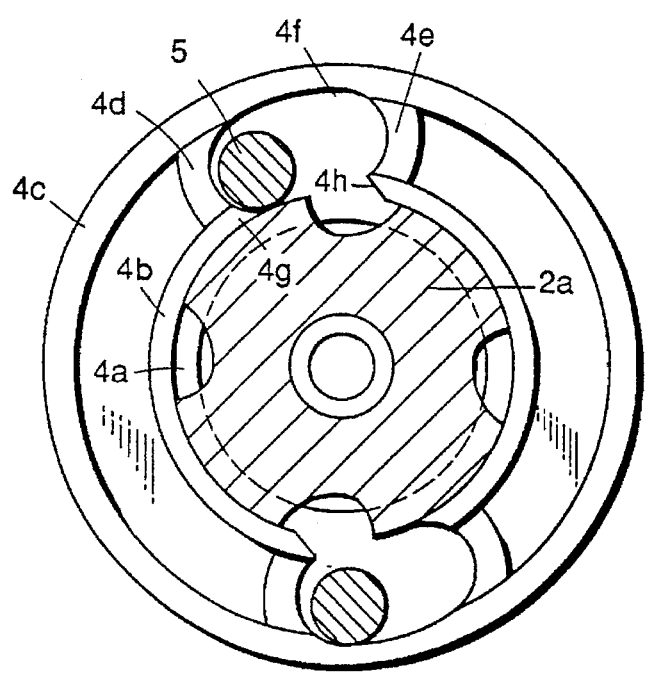

FIGS. 1A, 1B; 2 and 3A, 3B, 3C illustrate a measuring tape winding device embodying the present invention. FIG. 1A is a plan view of the measuring tape winding device with an upper half-housing removed. FIG. 1B is an inside plan view of the removed upper half-housing and FIG. 2 is a sectional view taken along the plane II—II of FIG. 1A. FIG. 3A is an enlarged view of a housing-side recess, rollers and the supporting portion shown in FIG. 1A, FIG. 3B is an enlarged view of the supporting portion shown in FIG. 1B. FIG. 3C illustrates an assembly of the portions shown in FIGS. 3A and 3B. FIG. 3B shows the supporting portion inside out. In these drawings, there is shown a measuring tape winding device comprising a lower half-housing 1, a supporting shaft 1a, a mounting shaft 1b, an upper half-housing 2, a supporting shaft 2a, a stepped portion 2b, a housing-side recess 2c, a winding reel body 3, a bearing 3a, a reel cover 4, a flange 4a, a bearing 4b, a peripheral wall portion 4c, a first side-wall portion 4d, a second side-wall portion 4e, a reel-side recess 4f, a roller guiding portion 4g, a reel lock portion 4h, a roller 5, a measuring tape 6, driving spring 7, a clamp screw 8 and a hook 9.

The housing consists of the upper half-housing 1 and lower half-housing 2 to be jointed together at their stepped ends. The lower half-housing 1 has in its center the mounting shaft 1b whose base is the supporting shaft 1a integrally made therewith. The upper half-housing 2 has an inwardly projecting supporting shaft 2a formed integrally at the inside center thereof. The supporting shaft 2a has a concave end 2d for fitting on the end of mounting shaft 1b of the lower half-housing 1 and has a center hole for securing to the mounting shaft 1b with the clamp screw 8. The supporting shaft 2a and the mounting shaft 1b are coupled together at their engaging ends and integrally connected with each other by the clamping screw 8 screwed into a hole made in the mounting shaft 1b through the hole made in the shaft 2a from the outside of the upper half-housing 2. The supporting shaft 2a has a stepped portion 2b formed at the periphery of its end. The housing has four recesses 2c formed at intervals of 90 degrees in the peripheral wall of the supporting shaft. Each recess has a depth d2 deeper than the difference d1 in level of the stepped portion 2b.

The winding reel comprises a winding reel body 3 and the winding reel cover 4, which are assembled into one unit and mounted in the housing. The entire winding reel is hereinafter referred to as winding reel 3, 4. The winding reel body 3 is rotatably supported in the integrally formed bearing 3a fitted on the supporting shaft 1a of the lower half-housing 1. The winding reel cover 4 has a center hole which has a diameter larger than the outer diameter of the mounting shaft 1b of the lower half-housing and is provided with a flanged portion 4a formed at the periphery thereof for rotatably fitting on the stepped portion 2b of the supporting shaft 2a of the upper half-housing 2.

The winding reel cover 4 has an inner cylindrical bearing 4b which has a diameter slightly larger than the diameter of a center opening of the flanged portion 4a and has a peripheral wall 4c at the periphery thereof. As shown in FIG. 3A, the bearing 4b has two recesses 4f formed in its inner ring at an interval of 180 degrees and being open in the axial direction. The first side-wall portion 4d which is curved round in the rewinding direction is provided between a rewinding-side end of the opening portion and the peripheral wall 4c. The second side-wall portion 4e which is curved round in the unwinding direction is provided between an unwinding-side end of the opening portion and the peripheral wall 4c. The first side-wall 4d, the second side-wall 4e and the peripheral wall 4c form a recessed space that is the reel-side recess 4f disposed in the winding reel cover 4 opposite to the upper half-housing 2.

When the upper half-housing 2 is assembled with the lower half-housing 1, two reel-side recesses 4f are covered with the upper half-housing 2 in such a manner that the outer cylindrical surface of the supporting portion 2a with openings of the housing-side recesses 2c formed therein opposes openings of the reel-side recesses 4f each containing one roller 5 which may have a cylinder-like or ball-like form. The combination of the rollers 5, the reel-side recesses 4f and the housing-side recesses 2c realizes the proposed lock-and-release capability of the winding device as described below.

The winding reel body 3 contains the driving spring 7 in its inside middle portion enclosed within the winding reel cover 4. The driving spring 7 is secured at its inside end to the mounting shaft 1b and at its outside end to the winding reel body 3. The measuring tape 6 is secured at one end to the winding reel body 3 and is wound onto the outer cylindrical surface thereof. The free end of the measuring tape is provided with a hook 9 which prevents the free end of the measuring tape from being drawn into the housing when rewinding the tape and is used for hooking the tape end on the object to be measured. When the measuring tape 8 marked off in units and wound spirally onto the outer cylindrical surface of the winding reel body 3 is manually drawn out of the housing 2 by a necessary length, the spiral spring 7 in the winding reel is increasingly energized to accumulate its force. After measurement, the drawn-out measuring tape 6 can be automatically rewound by the accumulated force of the driving spring 7.

Referring now to FIGS. 3A to 3C, the housing-side recesses and the reel-side recesses will be described in detail as follows.

The roller guiding portion 4g is the rewinding-side end of the opening portion formed in the bearing 4b of the winding reel cover 4 while the reel fixing portion 4h is the unwinding-side end of the opening portion formed in the bearing 4b. The roller guiding portion 4g has an edge sharpened to an acute angle $\theta_1$ at the opening while the reel fixing portion 4h has a dull edge with an obtuse angle $\theta_2$ at the opening. On the other hand, the housing-side recesses 2c formed on the outer cylindrical surface of the supporting shaft 2a has an acute slope in the rewinding direction and a gentle slope in the unwinding direction. Its bottom is deepened increasingly in the rewinding direction. When the upper half-housing and the lower half-housing are assembled, the reel-side recesses and the housing-side recesses may oppose with each other at the cylindrical surface of the supporting shaft.

Figure 4A:
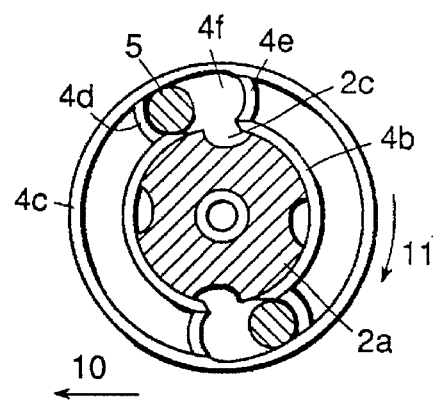
FIGS. 4A and 4B are illustrative of states of rollers while a winding reel rotates.
Figure 4B:
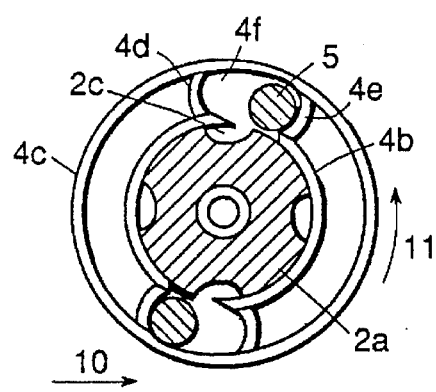

Referring to FIGS. 4A, 4B; 5A, 5B, 5C; and 6A, 6B, 6C, the operation of the above-mentioned embodiment will be described below.

The same components as those shown in FIGS. 3A to 3C are given the same reference numerals. Numeral 10 designates the direction in which the measuring tape moves and numeral 11 designates the direction in which the winding reel rotates. FIGS. 4(A) to 6(C) illustrate the winding device in the state that the lower half-housing is assembled with the upper half-housing as shown in FIG. 3C.

FIGS. 4A and 4B illustrate how the rollers move while the winding reel rotates. FIG. 4A depicts the rollers when the measuring tape is drawn out of the housing. FIG. 4B depicts the rollers when the measuring tape is rewound into the housing.

When the measuring tape 6 (not shown) is rapidly drawn out of the housing, the rollers turn round together with the winding reel 3, 4, being kept in the reel-side recesses and pressed against the first side-wall 4d by the action of centrifugal force produced by the clockwise rotation of the winding reel 3, 4 as shown in FIG. 4A. The winding reel 3, 4 freely rotates about the supporting shaft 1a of the lower half-housing 1 and the supporting shaft 2a of the upper half-housing 2, allowing the measuring tape to be drawn out of the housing.

While the measuring tape 6 is fast rewound on the winding reel 3, 4, the rollers can always be held in the housing-side recesses since they are pressed against the second side-wall 4e by the action of centrifugal force produced by the counterclockwise rotation of the winding reel 3, 4 as shown in FIG. 4B. The winding reel 3, 4 freely rotates to wind thereon the measuring tape drawn into the housing.

Figure 5A:
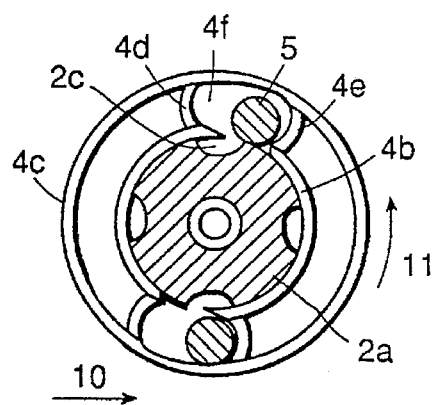
FIGS. 5A, 5B and 5C are illustrative of states of rollers when a measuring tape is fixed by a slight rewinding.
Figure 5B:
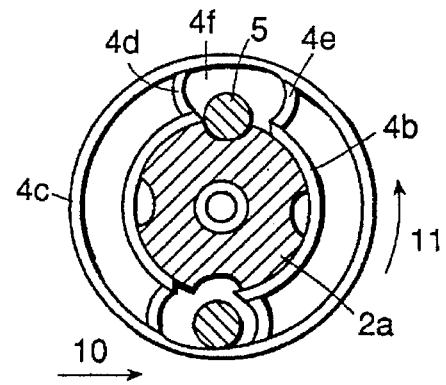
Figure 5C:
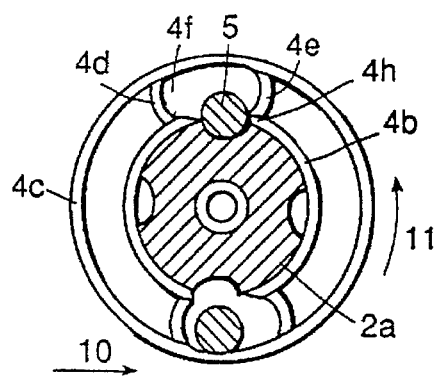

FIGS. 5A, 5B, 5C illustrate the behavior of the rollers when the measuring tape is locked. FIGS. 5A, 5B and 5C show the respective acting steps of the rollers. When a user pulls the measuring tape out of the housing by an adequate length and then allows it to be slowly brought back by several centimeters into the housing by the rotation of the winding reel 3, 4 in the tape rewinding direction, the rollers 5 are in the respective positions shown in FIG. 5A. The upper roller 5 moves on the cylindrical surface of the supporting shaft 2a in the rewinding direction, being urged by the reel fixing portion 4h, and then falls in the housing-side recess 2c by gravity as shown in FIG. 5B.

The rollers then turn into the state shown in FIG. 5C. The reel fixing portion 4h having an obtuse angle to the opening presses the upper roller 5 from the upper right toward the rewinding direction, thereby the upper roller 5 is pressed at its lower left part against an acute slope of the housing-side recess 2c without being pushed-out from the housing-side recess 2c into the reel-side recess 4f. Under the above-mentioned condition, the reel-side recess 4f can not further move, thereby the winding reel 3, 4 can be locked. The measuring tape 6, since it is pulled in the rewinding direction by the force of the driving spring involved in the winding reel, can be fixed without being rewound when the user releases his hold of the tape.

The lower roller 5 remains in the reel-side recess 4f, not participating in locking the measuring tape. In rewinding the measuring tape 6, either one of two rollers falls in the uppermost located housing-side recess 2c to lock the measuring tape 6 while the winding reel 3, 4 rotates a half revolution. In using the measuring tape 6 stretched upwardly from the housing placed in the vertical position, the same operation of the winding device is realized since at least one of four housing-side recesses 2c will be positioned near the top (even if the housing is tilted forward or backward), allowing either one of the rollers to fall therein to fix the measuring tape 6 by locking the winding reel 3, 4. Once either one of the rollers is held in one of the housing-side recesses as shown in FIG. 5C, the locking condition can be maintained when the housing is replaced in the horizontal position.

It shall be understood that the number of the reel-side recesses 4 each containing one roller 5 and their locations in the winding reel 3, 4 shall not be limited to those of the above-mentioned embodiment. The more reel-side recesses 4f that are provided, the less rotation angle of the winding reel is required for fixing the measuring tape. It is also understood that the number of the housing-side recesses and their locations are not limited to those of the illustrated embodiment. In using the winding device having an increased number of housing-side recesses in the vertical position with tilting its housing forward or backward, a plurality of the recesses may be located upwardly, making it possible to more reliably lock the measuring tape. The reel fixing portion 4h and the housing-side recesses 2c may be made to have any other form adapted for preventing the rollers from rolling out of the housing-side recesses.

Figure 6A:
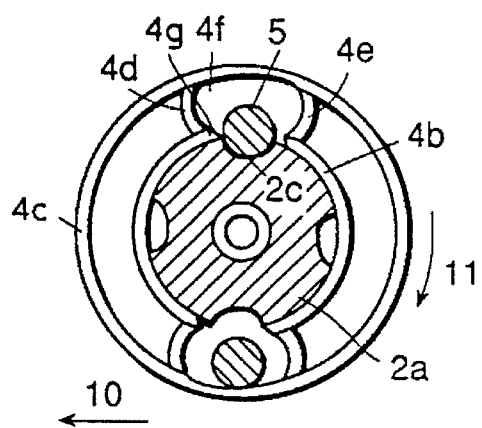
FIGS. 6A, 6B and 6C are illustrative of states of rollers when a measuring tape is released from the fixed state.
Figure 6B:
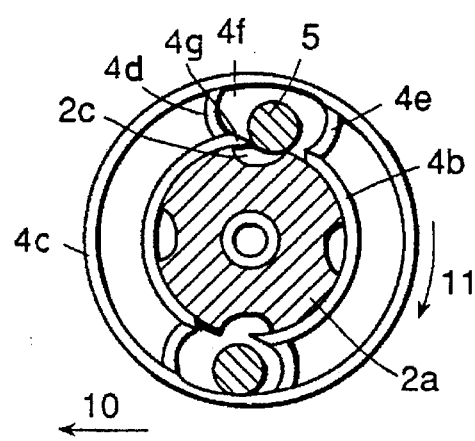
Figure 6C:
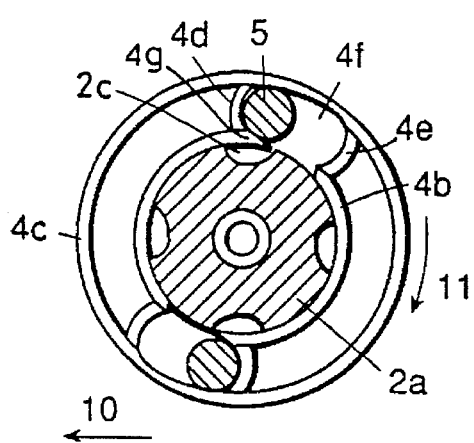

FIGS. 6A, 6B and 6C are illustrative of the behavior of rollers when a measuring tape is released by unlocking the winding reel. FIGS. 6A, 6B and 6C are views for explaining the changed states of the rollers 5 during the tape releasing operation. When the user slowly draws the measuring tape by several centimeters from the housing, causing the winding reel 3, 4 to revolve in the unwinding direction, the rollers 5 are brought from respective states shown in FIG. 5C into the states shown in FIG. 6A. One of two rollers 5, which is positioned above the other, is pushed at its lower left part in the unwinding direction by the roller guiding portion 4 having an acute angle to the opening. Therefore, the roller receives a force acting in the direction opposite to its lower left part about the center axis and is pressed at its lower right part against a gentle slope of the recess 2c. As a result of this, the roller 5 is then pushed out of the recess 2c and takes on the state shown in FIG. 6B. It may be mentioned that the roller can more easily move out of the recess if the latter has a more gentle slope in the unwinding direction. The roller guiding portion 4d pushes the upper roller from the housing-side recess 2c into the reel-side recess 4f and presses it against the first side-wall 4d.

The rollers 5 are then brought into the respective states shown in FIG. 6C. The upper roller 5 moves along the cylindrical surface of the supporting shaft 2a, being pushed by the first side-wall 4d. The lower roller 5 does not take part in drawing-out the measuring tape. The above-mentioned steps can occur when the user rapidly draws the measuring tape 6 from the housing. The roller guiding portion 4d and the housing-side recess 2c for fixing the roller therein may have any other shapes adapted for pushing the roller out of the housing-side recess.

The measuring tape 6 can be pulled out of the housing in the as-released condition after releasing the lock. When the measuring tape 6 is rapidly drawn out of the housing, the rollers are brought from the state shown in FIG. 6C into the state shown in FIG. 4A. In rewinding the measuring tape 6 after releasing the lock, the user releases his hold of the tape 6 in the condition shown in FIG. 6C to cause the winding reel 3, 4 to fast rotate in the rewinding direction by the action of the driving spring 7, rewinding the measuring tape 6 thereon in the condition shown in FIG. 4B.

Figure 7A:
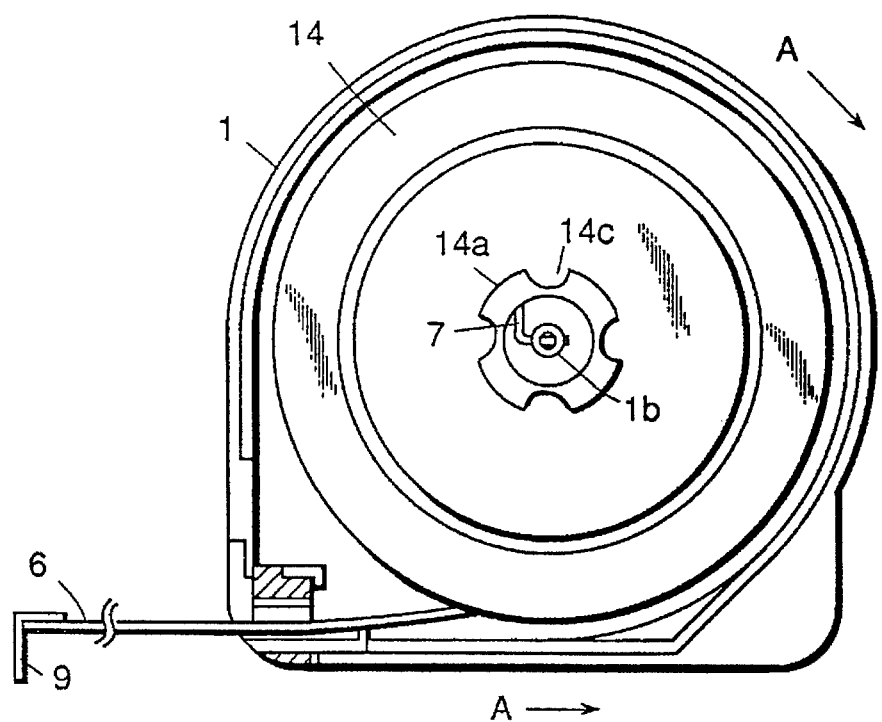
FIGS. 7A and 7B are plan views of another example of a measuring tape winding device embodying the present invention.
Figure 7B:
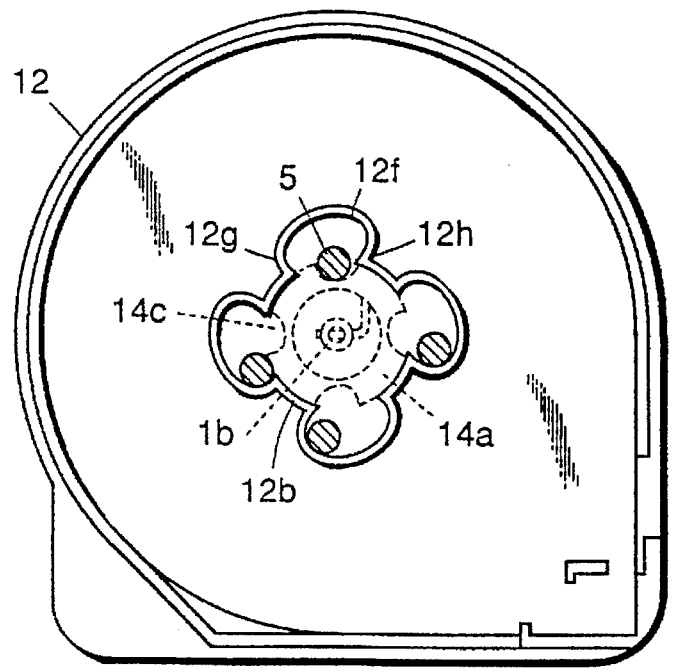

FIGS. 7A and 7B are plan views of another example of a measuring-tape winding device according to the present invention. FIG. 7A is a plan view of the device with its upper half-housing removed, and FIG. 7B is a plan view of an inside of the removed upper half-housing whereon the device of FIG. 7A is overlaid with the reversed center portion thereof for comparison with the plan view of FIG. 3C. In these drawings, components similar in function to those of FIGS. 1A to 3C are given the same reference numerals. In FIGS. 7A and 7B, an upper half-housing is given numeral 12, a bearing 12b, a housing-side recess 12f, a roller guiding portion 12g, a reel fixing portion 12h, a winding reel cover 14, a supporting shaft 14a and a reel-side recess 14c. In this embodiment, the winding reel cover 14 has the supporting shaft 14a which is supported in the bearing 12b mounted on the inside of the upper half-housing 12. Accordingly, this device is different from the embodiment of FIGS. 1A to 3C in that the supporting shaft 14a and the bearing 12b are arranged in reverse to those of the embodiment of FIGS. 1A and 3C. The supporting shaft 14a has four reel-side recesses 14c formed therein and the bearing 12b has four housing-side recesses 12f formed therein.

In case of pulling the measuring tape 6 out of the housing, the supporting shaft 14a of the winding reel cover 14 rotates clockwise (FIG. 7A). When any of reel-side recesses 14c turns round to the top position, the roller 5 falls in the recess 14c but bounds against the gentle slope of the reel-side recess and returns into the housing-side recess 12f. As a result of this, the winding reel freely rotates continuously with no impairment.

In case of rewinding the measuring tape 6, the supporting shaft 14a of the winding reel cover 14 rotates counterclockwise (FIG. 7A). In this case, the reel-side recesses revolve fast enough to return rollers 5 by the left end portion thereof into the corresponding housing-side recesses 12f. The winding reel can therefore continue its rotation.

The changed positions of the rollers in case of fixing the measuring tape 6 are similar to those shown in FIGS. 5A, 5B and 5C for the previously described embodiment. The user slowly rewinds the measuring tape 6 by several centimeters, thereby the upper roller 5 moves along the cylindrical surface of the supporting shaft 14a in the rewinding direction and is pressed by the reel fixing portion 12h. The upper roller, therefore, falls in an uppermost one of reel-side recesses 14 formed in the outer peripheral surface of the supporting shaft.

The changed positions of the rollers in case of releasing the lock of the measuring tape 6 are similar to those shown in FIGS. 6A, 6B and 6C for the previously described embodiment. When the user slowly draws out the measuring tape 6 by several centimeters, the roller guiding portion 12g pushes the lower left part of the upper roller 5 to the right and urges its lower right part against the gentle slope of the housing-side recess 14c. As a result of this, the roller 5 is pushed out of the reel-side recess 14c.

Although the above-mentioned embodiment has the reel-side recesses and housing-side recesses provided in respective bearing mechanisms, it is also possible to form either of two kinds of recesses or both kinds of recesses in different member or members other than the bearing mechanisms.

As is apparent from the foregoing, a winding device according to the present invention is capable of reliably fixing a measuring tape drawn from the housing in a desired position by using a simple mechanism and without applying any external force onto the tape and releasing the fixing mechanism for the measuring tape without using any operating part such as a lock-releasing push button. The use of the proposed winding device enables a tape measure to effectively fix and release a measuring tape without increasing the size of its housing and to reliably operate in a vertical position independently of the inclination of the housing forward and backward.

We claim:

1. A winding device for winding a measuring tape, comprising a winding reel rotatably supported by a supporting shaft, a winding spring, a housing for accommodating the winding reel, the housing having a first recess with an outwardly directed opening and the winding reel having a second recess having an inwardly directed opening, said second recess having a depth increasing in a rewinding direction of the winding reel, the first and the second recesses being opposed to each other at their openings along the cylindrical surfaces of the housing and the winding reel, and a roller movably disposed between both recesses by slowly revolving the winding reel in the rewinding direction to lock the winding reel from further rotating.

2. A winding device for winding a measuring tape, comprising a winding reel rotatably supported by a supporting shaft, a winding spring, a housing for accommodating the winding reel, the winding reel having a plurality of first recesses each with an inwardly directed opening and the housing having a plurality of second recesses each having an outwardly directed opening and a depth increasing in a winding direction of the winding reel, the first recesses and the second recesses opposing each other at their respectively openings along the cylindrical surface of the winding reel and the housing, a roller movably disposed in the first recesses and operable to be disposed between both the first and second respective recesses by slowly revolving the winding reel in a rewinding direction to lock the winding reel from further rotating, said housing comprises a lower half-housing having, at its inside center, a mounting shaft which has a tapped hole in a top end thereof, said lower half-housing having a base, said supporting shaft having a first part integrally formed at said base, said upper half-housing having an inside center, said supporting shaft having a second part projecting inwardly and integrally formed with said upper half-housing at said inside center, the second part of the supporting shaft of the upper half-housing having at its inside center, a fitting portion for engagement with the mounting shaft of the lower half-housing and has a tapped hole through which a screw is received in the tapped hole of the mounting shaft, the lower half-housing and the upper half-housing being connected with each other by said screw, the second part of the supporting shaft of the upper half-housing having a stepped portion formed at its peripheral end, said plurality of second recesses being formed at the periphery of the stepped portion at a specified angular interval therebetween, each of said second recesses having a depth deeper than the depth of the stepped portion.

3. A winding device as defined in claim 2, wherein the winding reel comprises a winding reel body and a winding reel cover, the winding reel body having a bearing rotatably fitted onto the first part of the supporting shaft of the lower half-housing, the winding reel cover having a center hole whose diameter is larger than the outer diameter of the mounting shaft of the lower half-housing and has at its periphery a flange portion for engagement with the stepped portion of the second part of the supporting shaft of the upper half-housing, and a cylindrical bearing whose bore is slightly larger than a center hole in the flange portion and by which the winding reel cover is rotatably fitted on the second part of the supporting shaft of the upper half-housing.

4. A winding device as defined in claim 3, wherein the cylindrical bearing has a peripheral wall having a plurality of openings formed at a specified distance, said openings each having a first side-wall which is curved around toward the rewinding direction and which extends from the rewinding-side peripheral edge around the opening to the peripheral wall, each of said openings having a second side-wall which is curved around toward the unwinding direction and which extends from the unwinding-side peripheral end around the opening to the peripheral wall, the space surrounded by the first side-wall, the peripheral wall and the second side-wall forming the first recesses in the surface of the winding reel cover, said surface being opposite to the upper half-housing.

5. A winding device as defined in claim 4, when the first recesses each accommodate a ball-like or cylinder-like rolling element.

6. A winding device as defined in claim 4, wherein a rewinding-side end at an opening of the bearing of the winding reel cover has an acute angle $\theta_1$ at the periphery around the opening of the bearing and an unwinding-side end has an obtuse angle $\theta_2$ at the periphery around the bearing opening.

7. A winding device as defined in claim 2, wherein the second recesses formed in the periphery of the supporting shaft have an acute slope in the rewinding direction and a gentle slope in the unwinding direction and have a depth increasing in the rewinding direction.

* * * * *